United States Patent [19]
Higuchi et al.

[11] Patent Number: 6,009,070
[45] Date of Patent: Dec. 28, 1999

[54] MULTI-LAYER OPTICAL DISK HAVING A REFLECTION LAYER COMPRISING THIN METAL FILM AND A DIELECTRIC

[75] Inventors: Takanobu Higuchi; Satoshi Jinno, both of Tsurugashima, Japan

[73] Assignee: Pioneer Electronic Corporation, Tokyo, Japan

[21] Appl. No.: 08/838,926

[22] Filed: Apr. 23, 1997

[30]     Foreign Application Priority Data

Apr. 24, 1996  [JP]  Japan ..................................... 8-127848

[51] Int. Cl.[6] ....................................................... G11B 7/24
[52] U.S. Cl. ........................................ 369/275.1; 369/283
[58] Field of Search ............................. 369/275.1, 275.4, 369/13, 94, 275.3, 275.2, 111, 283, 112, 286; 428/626, 652, 694 ML, 694 SC

[56]              References Cited

U.S. PATENT DOCUMENTS

| | | | |
|---|---|---|---|
| 5,192,626 | 3/1993 | Sekiya et al. ............................. | 428/694 |
| 5,292,592 | 3/1994 | Itoh ......................................... | 428/626 |
| 5,708,652 | 1/1998 | Ohki et al. ............................. | 369/275.1 |
| 5,708,653 | 1/1998 | Okada et al. ......................... | 369/275.1 |

FOREIGN PATENT DOCUMENTS 2017379   10/1979   United Kingdom .

OTHER PUBLICATIONS

M. Kaneko, "Direct overwriting & Super resolution using exchange–coupled magnetic multilayer Disks", IEEE Transaction on magnetics, vol. 28, No. 5, Sep. 1992, pp. 2494–2699.

*Primary Examiner*—Ali Neyzari
*Attorney, Agent, or Firm*—Fish & Richardson, P.C.

[57]              ABSTRACT

A double-layer optical disk having characteristics that are less wavelength dependent, allows the use of a pickup comprising a light beam of a different wavelength to read each layer accurately and stably. In the double layer optical disk which comprises, a first reflection layer carrying first information, a spacer layer, and a second reflection layer carrying second information, each laminated on a transparent substrate having a specific refractive index thereby allowing a pickup to read said first and second information, the first reflection layer is formed by laminating a metal layer made of a metal thin film and a dielectric layer made of a dielectric having a refractive index higher than the refractive index of the transparent substrate.

14 Claims, 7 Drawing Sheets

MULTI-LAYER OPTICAL DISK HAVING A REFLECTION LAYER COMPRISING THIN METAL FILM AND A DIELECTRIC

BACKGROUND OF THE INVENTION

1. Field of the Invention

The present invention relates to an optical disk having a plurality of reflection layers having pits or grooves carrying information, formed into a multi-layer structure.

2. Description of Related Art

Multi-layer optical disks are known as disks having a structure that a plurality of reflection layers respectively having pits or grooves carrying information are formed into a multi-layered structure, so that the information carried by each layer is optically read from one side of the disk. Among various multi-layer optical disks, double layer optical disks are used widely.

In recent years, there is a demand for increasing the recording density of each reflection layer of the multi-layer optical disk. To meet the requirement of high-density recording of information, it is conceivable to make pits or grooves on each reflection layer smaller and form them at higher density, to use a laser beam of a shorter wavelength for reading information carried by such a high-density disk.

When a gold thin film is used for the reflection layer, however, the reading of information on the reflection layer by means of the laser beam of a shorter wavelength becomes inaccurate because the optical characteristics of the gold thin film is largely wavelength dependent. Thus, when gold is used, the first layer of the double-layer optical disk becomes unable to function as an intermediate layer.

If, on the other hand, a dielectric multilayer is used as the intermediate reflection layer, it is possible to obtain desired optical characteristics. However, the use of dielectric multilayer has been practical not possible because of the problems such that the available percentage in its production process is very low because a number of steps are required to produce the layer whose total thickness amounts to more than one thousand nanometers, that desired reflectivity and transmittivity cannot be stably obtained because of the generation of cracks during its production process, and that degrading of the signal is caused by changes of the effective pit shape or optical interference.

OBJECT AND SUMMARY OF THE INVENTION

The present invention was made to solve the problems described above, and an object of the present invention is to provide a two-layer optical disk having characteristics which are less wavelength dependent, and reading of each layer can be performed by accurately and stably also by a pickup comprised of a light beam of a different wavelength as well.

According to the first aspect of the present invention, the double layer optical disk comprises, a first reflection layer carrying first information, a spacer layer, and a second reflection layer carrying second information, each laminated on a transparent substrate having a specific refractive index thereby allowing a pickup to read said first and second information, wherein the first reflection layer is formed by laminating a metal layer made of a metal thin film and a dielectric layer made of a dielectric having a refractive index higher than the refractive index of the transparent substrate.

According to a second aspect of the invention, the double layer optical disk comprises, a first reflection layer carrying first information, a spacer layer, and a second reflection layer carrying second information, each laminated on a transparent substrate having a specific refractive index thereby allowing a pickup to read the first and second information, wherein the first reflection layer is formed by laminating a first dielectric layer made of a dielectric having a refractive index substantially equal to the refractive index of said substrate, a metal layer made of a metal thin film and a second dielectric layer made of a dielectric having a refractive index higher than the refractive index of said transparent substrate.

According to the third aspect of the invention, in the above double-layer optical disk, the dielectric constituting the dielectric layer is any one of a metal sulfide, a metal oxide, a metal fluoride, and a compound of these materials.

According to the fourth aspect of the invention, in the above double-layer optical disk, the material of the metal thin film is selected from metals of Al, Au, Cu, Ni, Pt, Zn, Ag, an alloy including one of these metals as a main ingredient, and a compound including one of these metals as main ingredient.

According to the fifth aspect of the invention, the double layer optical disk comprises a first reflection layer carrying first information, a spacer layer, and a second reflection layer carrying second information, each laminated on a transparent substrate having a specific refractive index thereby allowing a pickup to read the first and second information, wherein the first reflection layer is formed by laminating a first dielectric layer made of a dielectric having a refractive index higher than the refractive index of said transparent substrate and a layer made of a metal thin film of any one of simple silver, an alloy containing silver as a main ingredient, and a compound including silver as a main ingredient.

According to the sixth aspect of the invention, the double layer optical disk comprises a first reflection layer carrying first information, a spacer layer, and a second reflection layer carrying second information, each laminated on a transparent substrate having a specific refractive index thereby allowing a pickup to read the first and second information, wherein the first reflection layer is formed by laminating a first dielectric layer made of a dielectric having a refractive index higher than said refractive index of said transparent substrate, a layer made of a metal thin film of any one of simple silver, an alloy containing silver as a main ingredient, and a compound including silver as a main ingredient, and a second dielectric layer made of a dielectric having a refractive index substantially equal to the refractive index of the transparent substrate.

As the double-layer optical disk according to the present invention is formed as described above, the intermediate reflection film of the double-layer optical disk is formed by combining a thin layer formed by a dielectric compound layer having a refractive index higher than that of the transparent substrate and a thin film made of a metal, into a multilayer film. With this structure, the wavelength dependency of the reflectivity and transmittivity is reduced, so that information carried by the bits or grooves formed on each reflection layer of the double-layer optical disk is optically read at high accuracy and stability as well, even when a pickup comprising an optical beam of a different wavelength is used.

BRIEF DESCRIPTION OF THE DRAWINGS

FIGS. 4A through 4C are partly cross-sectional views showing concrete structures of embodiments of the double-layer optical disk according to the present invention, wherein FIG. 4A shows a first embodiment, FIG. 4B shows a second embodiment, and FIG. 4C shows a third embodiment;

DETAILED DESCRIPTION OF THE PREFERRED EMBODIMENTS

Before entering into the explanation of the preferred embodiments of the present invention, an example of conventional double-layer optical disks will be explained with reference to the accompanying drawings.

Figure 1:
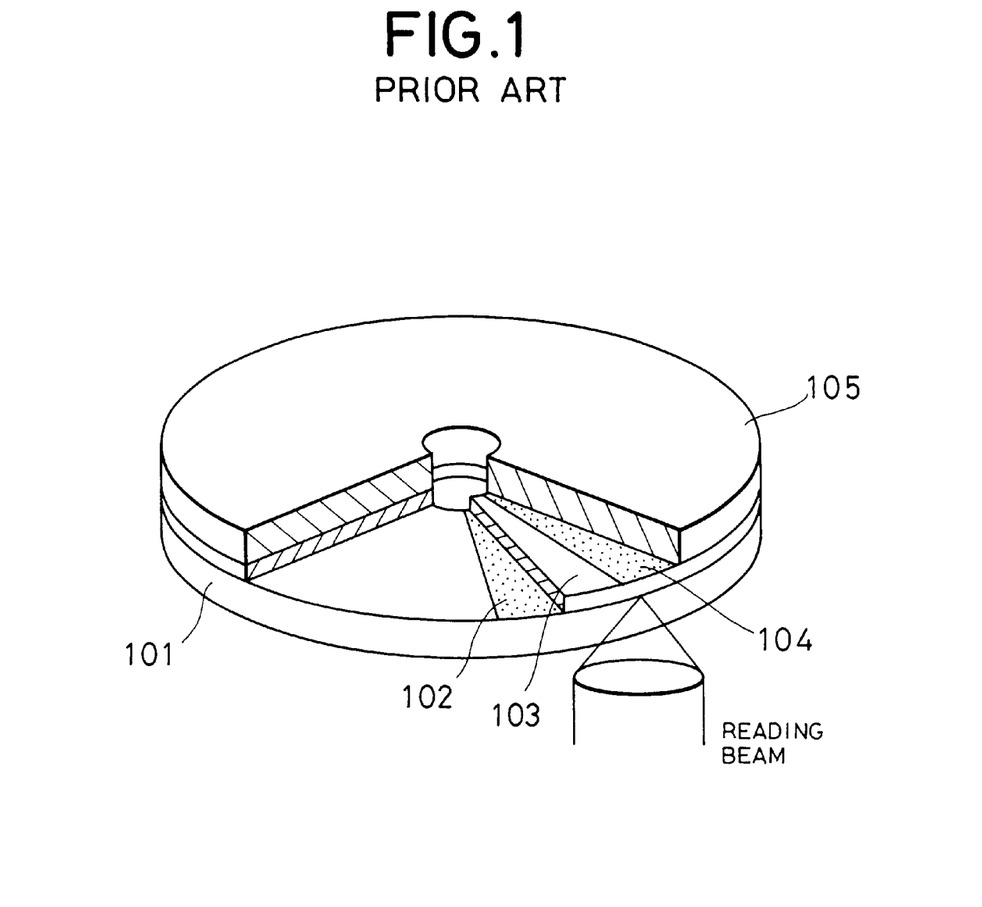
FIG. 1 is a schematic diagram showing the structure of a conventional double-layer optical disk in which a major internal structure is partly depicted.

FIG. 1 is a schematic diagram showing an example of conventional double-layer optical disk, with its internal structure being partially depicted to show major elements. As shown in this figure, the double-layer optical disk has a transparent substrate 101 of a disk shape having a predetermined thickness, formed by the injection molding of a transparent synthetic resin. On one side of the transparent substrate 101, bumps and depressions in the form of pits or grooves (not illustrated in the drawing) corresponding to first information are formed in a spiral or coaxial shape, and the transparent substrate is coated with a semitransparent thin film having predetermined reflectivity and transmittance which is closely adhered to the bumps and depressions. The semitransparent thin film, therefore, has a surface shape conformed to the bumps and depressions, and together forms a reflection layer 102 having pits or grooves carrying first information.

A spacer layer 103 of a predetermined thickness made of, for example, a transparent ultraviolet-curable resin is laminated on the reflection layer 102, and a reflection layer made of a metal thin film having a high reflectivity is laminated thereon. Bumps and depressions (not illustrated in the drawing) corresponding to second information are formed, in a spiral or coaxial shape, on the spacer layer 103 which closely adheres to reflection layer 104, so that the bumps and depressions are fully coated with the reflection layer 104.

The reflection layer 104 therefore has a surface shape conformed to the bumps and depressions on the spacer layer 103, to have pits or grooves carrying second information. A substrate 105 is formed on the reflection layer 104.

Another way to produce a double-layer optical disk is as follows. Bumps and depressions (not illustrated in the drawing) corresponding to the first information in the form of pits or grooves are formed on one side of the transparent substrate 101 in a spiral or coaxial shape, and the transparent substrate 101 is coated with a semitransparent thin film having a predetermined reflectivity and transmittance which closely adheres to the bumps and depressions. The semitransparent thin film, therefore, has a surface shape conformed to the bumps and depressions, to constitute the reflection layer 102 having pits or grooves carrying first information.

On one side of the substrate 105, bumps and depressions (not illustrated in the drawing) in the form of pits or grooves corresponding to second information are formed in a spiral or coaxial shape. The substrate 105 is coated with a reflection layer 104 made of a metal thin film which has a reflectivity higher than that of the reflection layer 102 in a manner as to closely adhere to the bumps and depressions. Like the reflection layer 102, the reflection layer 104 has pits or grooves which carries second information.

The two substrate each covered with a reflection layer are glued together, for example, by the transparent ultraviolet-curable resin which forms the spacer layer 103 having the predetermined thickness.

Figure 2:
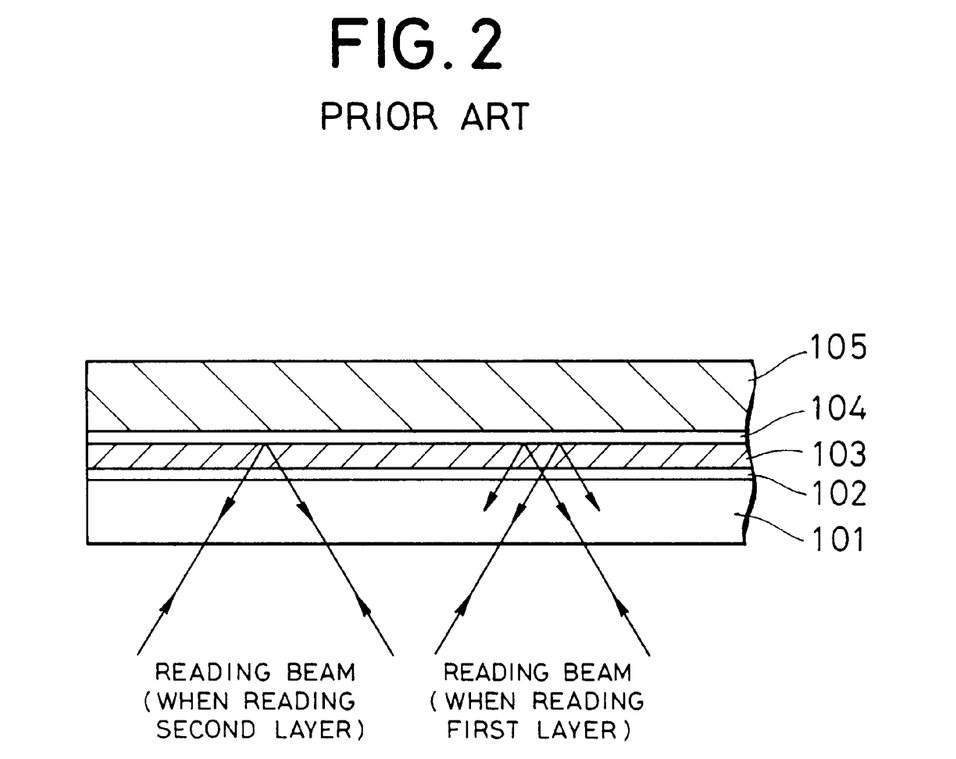
FIG. 2 is an enlarged diagram of reflection layers showing paths of a light beam when a reading beam of an optical pickup is used to read each reflection layer of the conventional double-layer optical disk shown in FIG. 1.

The double layer disks are formed in the manners as described above, and the reading of information is performed in the following way. As shown in FIG. 2, when reading the first layer through the transparent substrate 101 by means of an optical pickup (not illustrated in the drawing) a reading beam of the optical pickup is focused on the reflection layer 102 that is an intermediate reflection film, and a reflection beam modulated by the pits or grooves formed on the reflection layer 102 is received. For reading the second layer, the reading beam of the pickup is caused to pass through the reflection layer 102 and focused on the reflection layer 104, and the reading of light is performed for the reflection light modulated by the pits or grooves formed on the reflection layer 104 obtained after further passing through the reflection layer 102. FIG. 2 is an enlarged cross-section of the two reflection layers showing the paths of the light beam of the optical pickup when reading the reflection layers of the two layer optical disk depicted in FIG. 1.

With the double-layer optical disks, when reading information on the second layer, the reading beam passes through the first layer twice in its irradiation path. Therefore, if the same reading beam of the optical pickup is used to read information of both layers, it is desirable to form a thin layer having a small loss of transmission and a high reflection efficiency as the first reflection layer. To meet this, the first reflection layer that constitutes the intermediate reflection layer is made by a metal film having a thickness of about 15 nm (nanometers), the second reflection layer is made, for example, by aluminum, and the reading beam using a laser having a wavelength around 650 nm is used for the reading and reproduction of information of each layer.

In the manner as explained above, information recorded on the two layers can be selectively read without turning over the disk. Thus, information is recorded at high density, and information pieces carried by two layers can be read instantly by using a single optical pickup.

In recent years, on the other hand, to make the multi-layer optical disk to carry more information in each reflection layer, there is a demand of a multi-layer optical disk having the pits or grooves arranged in the spiral or coaxial form in each reflection layer that are made smaller and arranged at a higher density as compared with conventional multi-layer optical disks.

To read information from such a multi-layer optical disk, it is necessary to use a laser light beam of a shorter wavelength as the reading beam in accordance with the shape of the pits or grooves.

However, as mentioned before, if it is attempted to read information by a reading beam using a laser light beam of a wavelength shorter than the conventional value for the information carried by the pits or grooves that are formed by the gold thin film used in conventional two layer optical disks, the reading of information becomes inaccurate since the optical characteristics of the gold thin film such as its reflectivity and transmittance are largely dependent on the wavelength. This causes a problem that the reflectivity and transmittance of the first layer of the two layer optical disk are changed considerably, and the first layer loses the function of the intermediate layer.

If, on the other hand, a dielectric multi-layer film is used as the intermediate layer, desired optical characteristics can be obtained by laminating about three layers of dielectric materials for one wavelength. Since the dielectric multi-layer film exhibits high transmittance levels in other wavelength regions, an intermediate reflection layer that is usable for a plurality of wavelengths can be obtained by laminating dielectric multi-layer films that are optimized for each of the wavelength for the reproduction. With this scheme, as in the conventional cases a laser light beam having a wavelength around 650 nm can be used for forming the pits or grooves and reading information therefrom. Furthermore, from the same disk, information can be read by a reading beam using a laser light beam of a shorter wavelength.

When using dielectric multi-layer films, however, the total thickness of the films amounts to several thousands nm or more as mentioned before. Therefore, a problem has been encountered that such dielectric multi-layer films are not suited for practical use because of the reasons that the production of the films require many steps which in turn lowers the final available percentage of the films through its production, cracks are tend to be formed during the production of the films to prevent a stable generation of desired reflectivity and transmittance, and degradation of signal is caused by changes of the effective pit shape as a result of lamination or by optical interferences.

Figure 3:
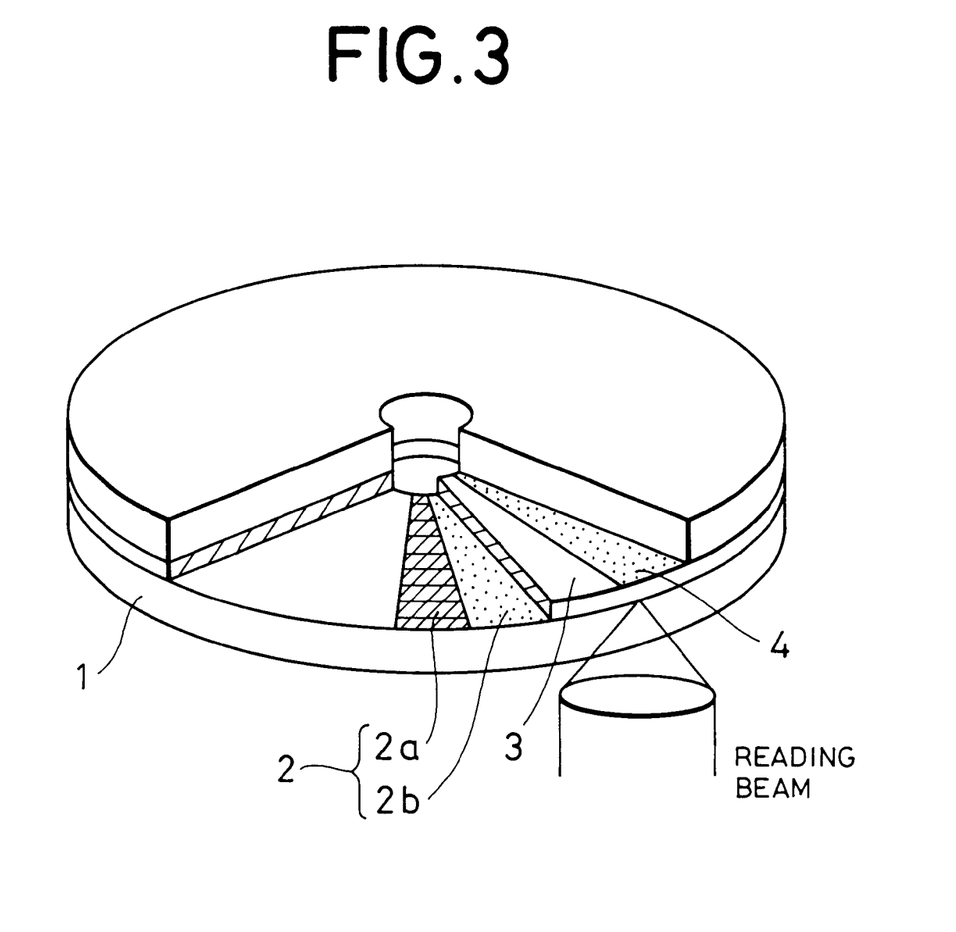
FIG. 3 is a schematic diagram showing the general structure of embodiments of the double-layer optical disk according to the present invention in which a major internal structure is partly depicted.

Now, the embodiments of the present invention will be described with reference to FIGS. 3 thorough 8 of the accompanying drawings. FIG. 3 is a schematic diagram showing a general structure of the embodiments of the two-layer optical disk according to the present invention in which major elements of the internal structure of the disk are partly depicted. As shown in the figure, the two layer optical disk has a disk shaped transparent substrate 1 of a predetermined thickness formed by an injection molding of a transparent synthetic resin. On one side of the transparent substrate 1, bumps and depressions (not illustrated in the figure) in the form of pits or grooves corresponding to first information are formed in a spiral or coaxial shape, and a reflection layer 2 is laminated on the transparent substrate 1. As illustrated in FIG. 3, the reflection layer 2 is constituted by a thin film 2a made of a metal, and a thin film 2b of dielectric material made of a dielectric material having a refractive index higher than that of the transparent substrate 1, the thin films 2a and 2b being laminated on the transparent substrate 1, to closely adhere to its surface. The thin films 2a and 2b are placed on the transparent substrate 1 so that the bumps and depressions in the form of pits or grooves are coated therewith, whereby the thin films 2a and 2b bear pits or grooves carrying first information.

As the material of the thin film 2a constituting the reflection layer 2, a metal such as aluminum (Al), gold (Au), copper (Cu), nickel (Ni), platinum (Pt), zinc (Zn), and silver (Ag) and the like can be used. Especially, when setting the lower limit of the reflectivity of the reflection layer 2 above 25%, it is desirable to use silver (Ag).

Moreover, it is possible to use an alloy containing any of the above described metals as the main constituents to which other elements for preventing oxidization or corrosion is added within a percentage range where the optical characteristics do not change significantly, or a mixture of metals.

As the material of the thin film 2b which also constitutes the reflection layer 2, a nitride such as $Si_3N_4$, or a metal sulfide such as ZnS, CeS, or a metal oxide such as $TiO_2$, $In_2O_3$, $ZrO_2$, ZnO, $Bi_2O_3$, $CeO_2$, $Eu_2O_3$, $HfO_2$, $La_2O_3$, $Nd_2O_5$, $MoO_3$, MgO, $Pr_6O_{11}$, $Sm_2O_3$, $Sb_2O_3$, $Sc_2O_3$, $SnO_3$, $SrTiO_3$, $Ta_2O_5$, $Y_2O_3$, a metal fluoride such as $PbF_2$, or a metal compound made of mixtures of any of the above materials such as $ITO(In_2O_3+SnO_2(5\%))$ is used. It is desirable that the material has a relatively high refractive index as compared with the transparent substrate 1.

On the reflection layer 2, a spacer 3 of a predetermined thickness is formed by using a transparent ultraviolet curable resin and the like, and a reflection layer 4 made of a metal thin film having a high reflectivity is formed thereon. On the surface of the spacer layer 3 which closely adheres to the reflection layer 4, bumps and depressions (not illustrated) in the form of pits or grooves corresponding to second information are formed in a spiral or coaxial shape, so that the reflection layer 4 covers the bumps and depressions in a closely adhered state. The reflection layer 4 thus has a surface configuration corresponding to the bumps and depressions, to have the pit series or groove carrying the second information. A substrate 5 is further provided on the reflection layer 4.

The double-layer optical disk according to the present invention has the structure explained above. When reading the first layer through the transparent substrate by means of an optical pickup (not illustrated) as with conventional double-layer optical disks, the reading beam of the pickup is focused on the reflection layer 2 which is the intermediate reflection layer, and a reflection beam modulated by the pits or groove formed on the reflection layer 2 is retrieved. When reading the second layer, the reading beam of the pickup is made to pass through the reflection layer 2 and is focused on the reflection layer 4, and a light beam obtained as a reflection light modulated by the pits or groove formed on the reflection layer 4 passes through the reflection layer 2 is retrieved.

Figure 4A:
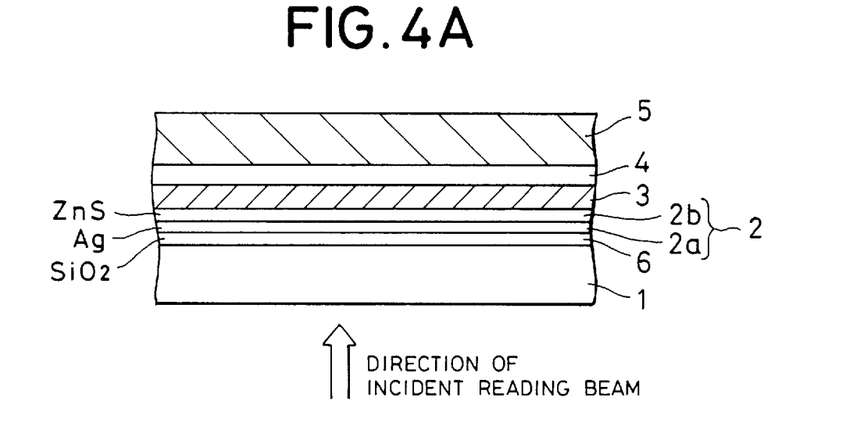

Now, the embodiments of the present invention are more concretely explained with reference to FIGS. 4 through 8. As shown in FIG. 4A, the first embodiment uses silver (Ag) as the material of the thin layer 2a and ZnS is used as the material of the thin layer 2b, and the thins layers 2a and 2b are laminated in the manner depicted in this figure, to form the reflection layer 2 that serves as the intermediate layer. The transparent substrate 1 is made of a synthetic resin having transparency and the like, which however exhibits a slight moisture absorbance. Hence, a thin layer made, for example, of $SiO_2$ is formed between the thin layer 2a and the substrate 1, in order to prevent the thin layer 2a from being oxidized or corroded by the reaction with the moisture from the substrate or residual monomers contained in the resin, and to stably maintain the initial optical performance of the reflection layer. Depending on the material used form the transparent substrate 1, the material for the thin layer 6 is suitably selected so that the layer 6 has a refractive index nearly equal to that of the transparent substrate 1. Thus, even though the thin layer 6 is inserted between the thin layer 2a and the transparent substrate 1, its optical influence can be ignored because the thin layer 6 can be regarded as a part of the transparent substrate 1.

Figure 4B:
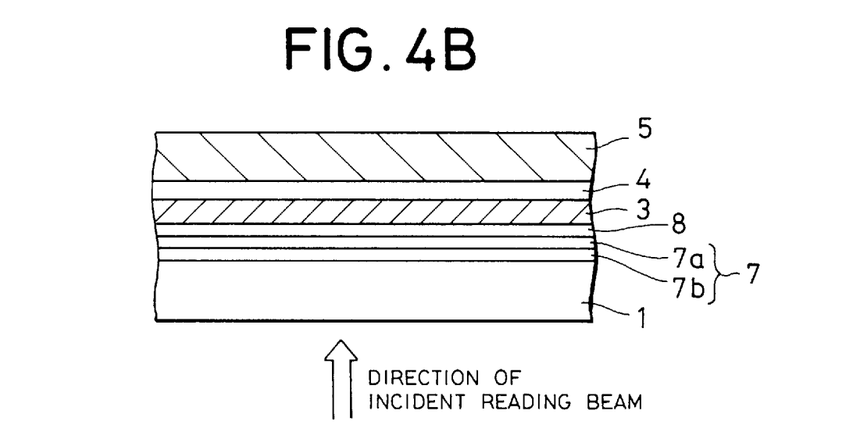

FIG. 4B shows a second embodiment of the double-layer optical disk in which a reflection layer 7 is used in stead of the reflection layer 2 shown in FIG. 4A and the reflection layer 7 is constituted by thin layers 7a and 7b which are the same as the thin layers 2a and 2b, but laminated in a reversed order viewed through the transparent substrate. The thin layer 7a is made of the same material as the thin layer 2a, and the thin layer 7b is made of the same material as the thin layer 2b, and the thickness of each thin layer is adjusted to an optimal value. Thus, the thin layer 7b made of ZnS and the thin layer 7a made of silver (Ag) are laminated in this order on the transparent substrate. Furthermore, a thin layer 8 made of $SiO_2$ is inserted between the thin layer 7a and the spacer layer 3 in order to prevent the thin layer 7a from being affected by the moisture or residual monomers contained in the spacer layer 3 made of a ultraviolet curable resin. The material of the thin layer 8 is suitably selected depending on the material used for the spacer layer 3 so that it has a refractive index nearly equal to that of the spacer layer 3. Therefore, the optical influence of the thin layer 8 can be ignored even through it is inserted between the thin layer 7a and the spacer layer because the thin layer 8 can be regarded as a part of the spacer layer 3.

Figure 5:
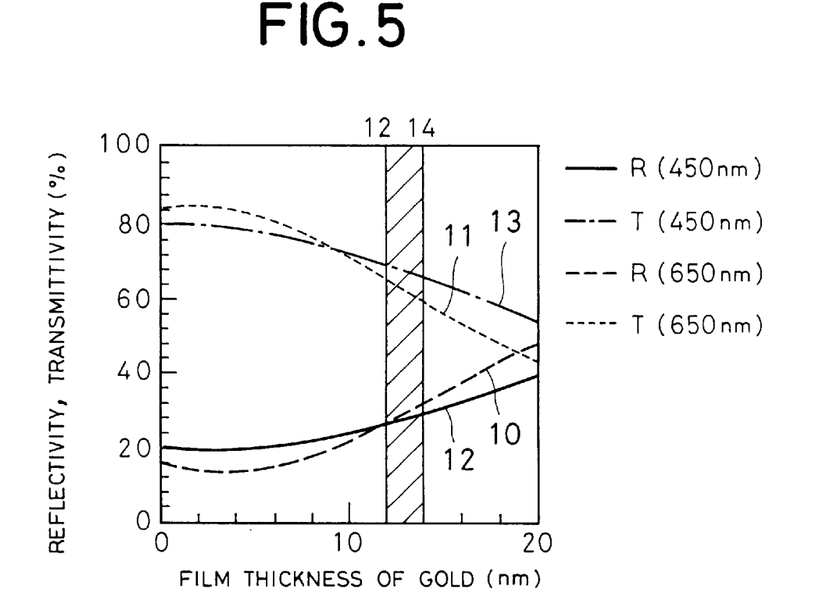
FIG. 5 is a diagram showing optical characteristics of the thin layer 7a relative to its thickness when the thickness of the ZnS layer used for the thin layer 7b of the reflection layer 7 in the second embodiment is set to 45 nm.

FIG. 5 shows the optical characteristics of the thin layer 7a relative to its film thickness when the thickness of the ZnS layer provided as the thin film 7b of the reflection layer 7 is set to 45 nm. The reference numerals 10 and 11 respectively denote characteristic curves of the reflectivity and transmittance when a laser light of 650 nm is used as the reading beam. The reference numerals 12 and 13 respectively denote characteristic curves of the reflectivity and transmittance with a laser light of 450 nm is used as the reading beam.

Figure 6:
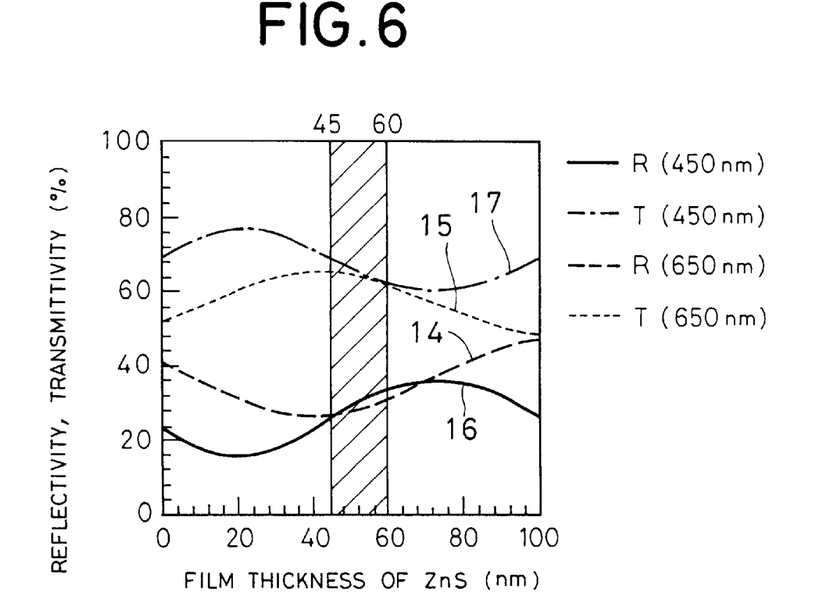
FIG. 6 is a diagram showing optical characteristics of the thin layer 7b relative to its thickness when the thickness of the silver (Ag) layer used for the thin layer 7a of the reflection layer 7 in the second embodiment is set to 12 nm.

FIG. 6 shows the optical characteristics of the thin film 7b relative to its film thickness when the thickness of the silver (Ag) layer provided as the thin film 7a of the reflection layer 7 is set to 12 nm. The reference numerals 14 and 15 respectively denote characteristic curves of the reflectivity and transmittance when a laser light of 650 nm is used as the reading beam. The reference numerals 16 and 17 respectively denote characteristic curves of the reflectivity and transmittance with a laser light of 450 nm is used as the reading beam. The thickness of the $SiO_2$ layer forming the thin layer 8 is set to 50 nm in the examples depicted in FIGS. 5 and 6.

As is appreciated from FIGS. 5 and 6, by setting the film thickness of the silver (Ag) layer used as the thin film 7a to be about a value between 12 nm and 14 nm, and setting the film thickness of the ZnS layer used as the thin film 7b to be about a value between 45 nm and 60 nm, the reflectivity and transmittance of the reflection layer 7 will become about 25% and about 65% respectively, in both cases that the laser light having the wave length of 650 nm is used as the reading beam and the laser light having the wavelength of 450 nm is used as the reading beam.

Therefore, by selecting a material of high reflectivity such as aluminum (Al) as the reflection layer 4, reflectivities of the reflection layers 4 and 7 can be both set at a relatively high reflectivity value ranging from 25% to 45%. Thus, reflection layers well suited for double-layer disks can be formed. Consequently, each of the reflection layers is accurately and stably read by using reading beams of two wavelengths of 450 nm and 650 nm.

Figure 4C:
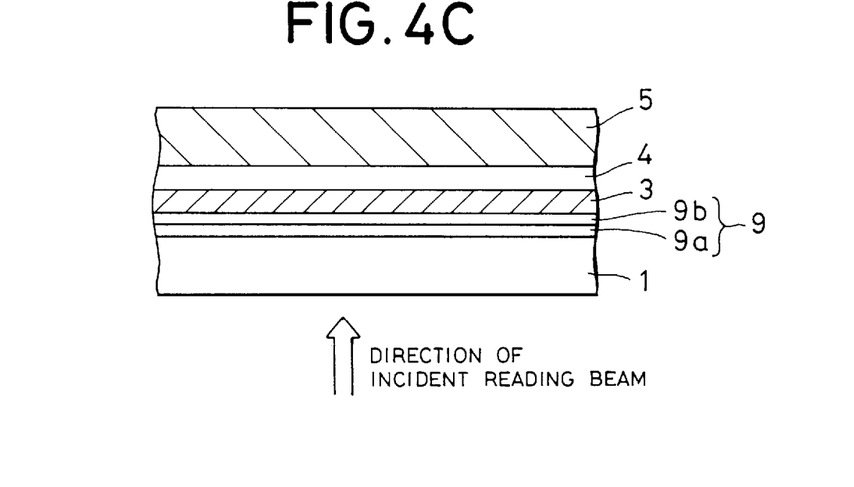

FIG. 4C shows a third embodiment of the invention in which gold (Au) is used as the material of a thin film 9a and ZnS is used as the material of a thin film 9b, and the thin films 9a and 9b are, as shown in the figure, laminated on the transparent substrate 1 in this order, to produce a reflection layer 9 that serves an intermediate film.

Figure 7:
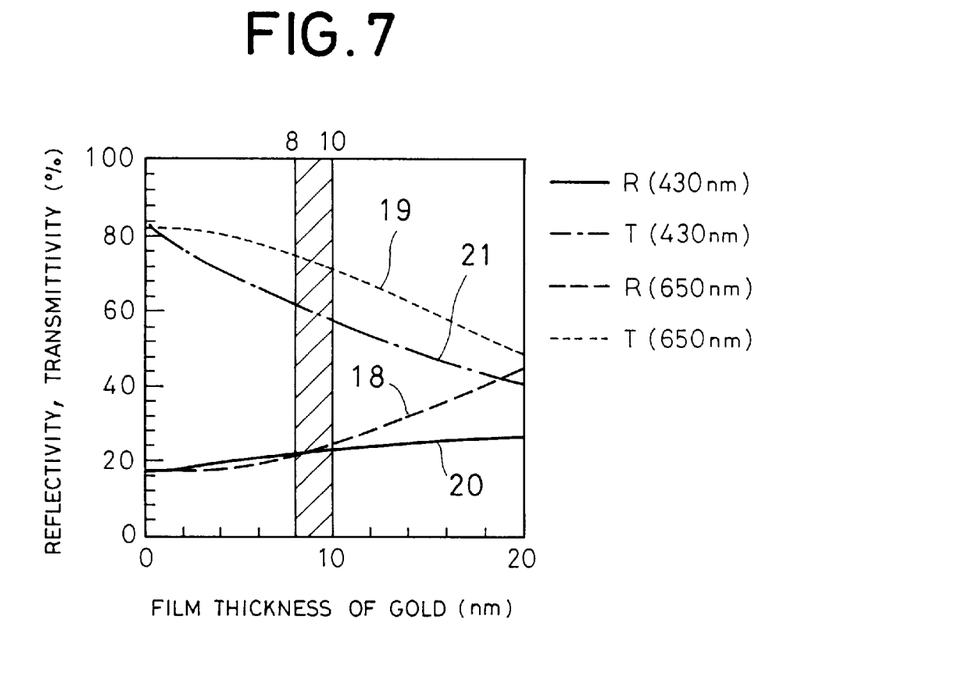
FIG. 7 is a diagram showing optical characteristics of the thin layer 9a relative to its thickness when the thickness of the ZnS layer used for the thin layer 9b of the reflection layer 9 in the third embodiment is set to 60 nm.

FIG. 7 shows the optical characteristics of the thin film 7a relative to its film thickness when the thickness of the ZnS layer provided as the thin film 9b of the reflection layer 9 is set to 60 nm. The reference numerals 18 and 19 respectively denote characteristic curves of the reflectivity and transmittance when a laser light of 650 nm is used as the reading beam. The reference numerals 20 and 21 respectively denote characteristic curves of the reflectivity and transmittance with a laser light of 450 nm is used as the reading beam.

Figure 8:
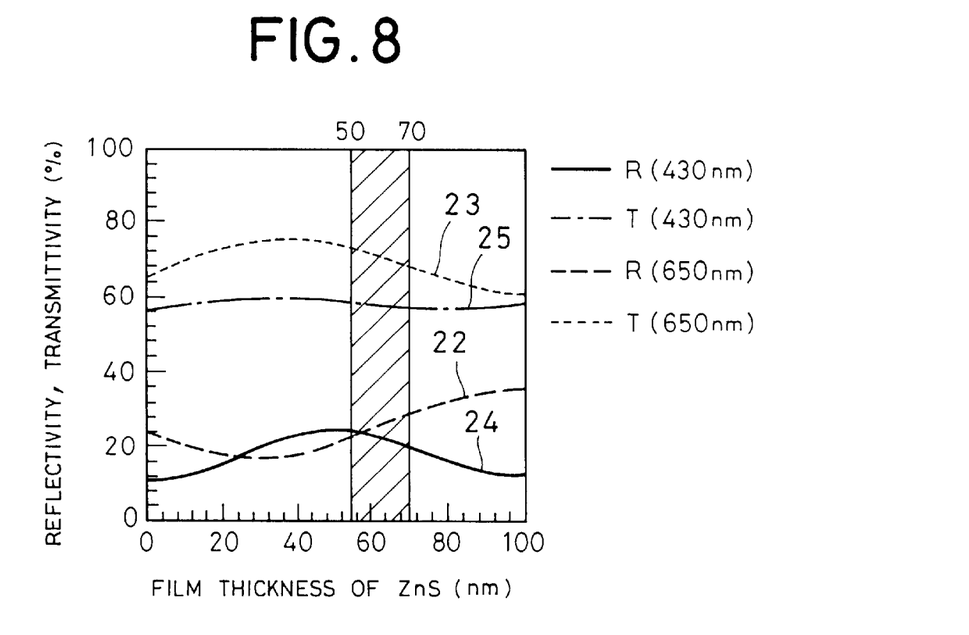
FIG. 8 is a diagram showing optical characteristics of the thin layer 9b relative to its thickness when the thickness of the gold (Au) layer used for the thin layer 9a of the reflection layer 9 in the third embodiment is set to 10 nm.
Figure 9A:
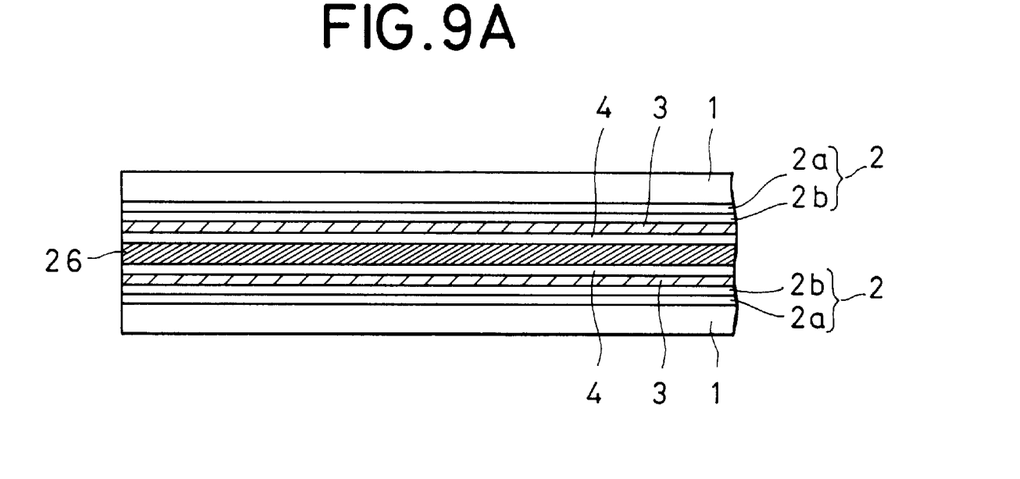
FIGS. 9A through 9C are a cross-sectional views schematically showing the structure of other embodiments of the double-layer optical disk according to the present invention, respectively.
Figure 9B:
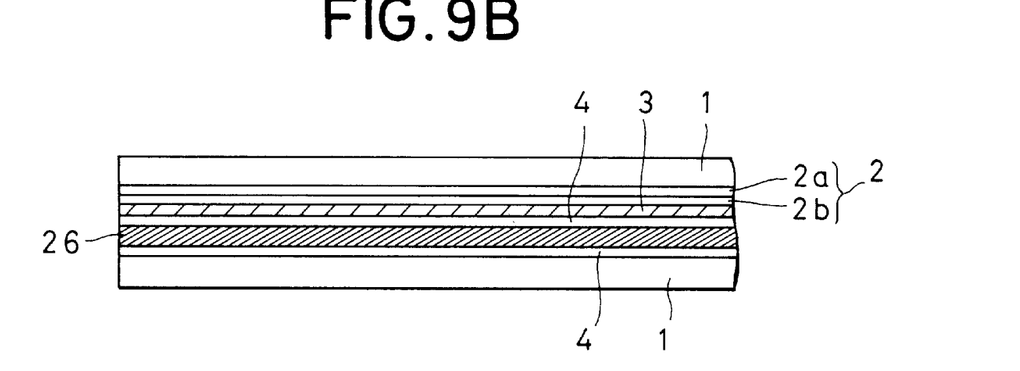
Figure 9C:
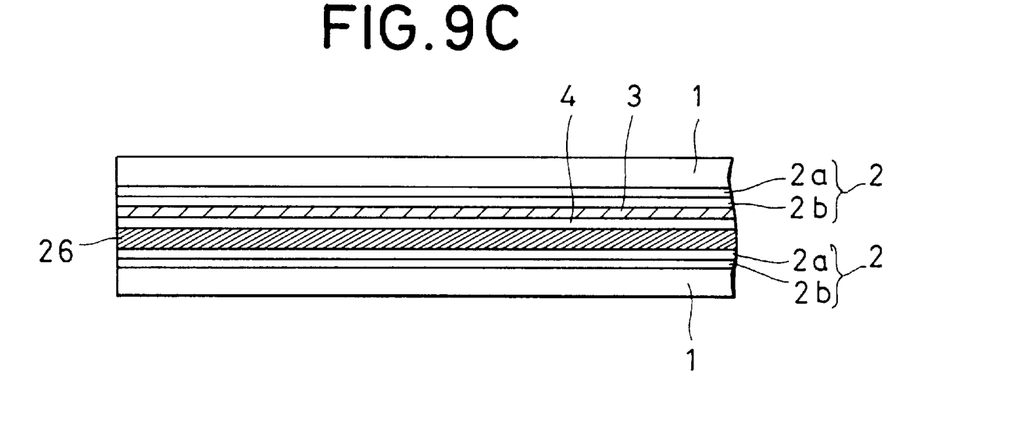

FIG. 8 shows the optical characteristics of the thin film 9b relative to its film thickness when the thickness of the gold (Au) layer provided as the thin film 9a of the reflection layer 9 is set to 10 nm. The reference numerals 22 and 23 respectively denote characteristic curves of the reflectivity and transmittance when a laser light of 650 nm is used as the reading beam. The reference numerals 24 and 25 respectively denote characteristic curves of the reflectivity and transmittance with a laser light of 430 nm is used as the reading beam.

As is appreciated from FIGS. 7 and 8, by setting the film thickness of the gold (Au) layer used as the thin film 9a to be about a value between 8 nm and 10 nm, and setting the film thickness of the ZnS layer used as the thin film 7b to be about a value between 50 nm and 70 nm, the reflectivity and transmittance of the reflection layer 7 will become about over 20% and more than 50% respectively, in either case that the laser light having the wave length of 650 nm is used as the reading beam and that the laser light having the wavelength of 430 nm is used as the reading beam.

Therefore, by selecting a material of high reflectivity such as aluminum (Al) as the reflection layer 4, reflectivities of the reflection layers 4 and 7 can be both set at a relatively high reflectivity value ranging from 20% to 45%. Thus, reflection layers well suited for double-layer disks can be formed. Consequently, each of the reflection layers is accurately and stably read by using reading beams of two wavelengths of 430 nm and 650 nm.

The double-layer optical disk according to the present invention has a structure described in the foregoing. Hence, the intermediate reflection film of the double-layer optical disk is formed by combining a thin layer formed by a dielectric compound layer having a refractive index higher than that of the transparent substrate and a thin film made of a metal, into a multilayer film, to reduce the wavelength dependency of the reflectivity and transmittivity. This allows information carried by the bits or grooves formed on each reflection layer of the double-layer optical disk to be optically read at high accuracy and stability as well, even when a pickup comprising an optical beam of a different wavelength is used.

While the described embodiments represent the preferred form of the present invention, it is to be understood that various modifications and variations will occur to those skilled in that art. It is therefore intended that all of such variations and modifications are within the scope of the invention which is determined by the appended claims.

What is claimed is:

1. A double layer optical disk comprising:
   a transparent substrate having a specified refractive index, and having a surface with a configuration representing a first set of information;
   a first reflection layer adhered to said surface of said transparent substrate;
   a spacer layer having a surface with a configuration representing a second set of information; and
   a second reflection layer adhered to said surface of said spacer layer, said first reflection layer, said spacer layer and said second reflection layer being consecutively laminated on said substrate to allow a pickup to read said first and second sets of information,
   wherein said first reflection layer comprises:
   a metal thin film layer and
   a dielectric layer having a refractive index higher than the refractive index of said transparent substrate.

2. A double layer optical disk comprising:
   a transparent substrate having a specified refractive index, and having a surface with a configuration representing a first set of information;
   a first reflection layer adhered to said surface of said transparent substrate;
   a spacer layer having a surface with a configuration representing a second set of information; and
   a second reflection layer adhered to said surface of said spacer layer, said first reflection layer, said spacer layer and said second reflection layer being consecutively laminated on said substrate to allow a pickup to read said first and second sets of information,
   wherein said first reflection layer comprises:
   a first dielectric layer having a refractive index substantially equal to the refractive index of said substrate,
   a metal thin film layer, and
   a second dielectric layer having a refractive index higher than the refractive index of said transparent substrate.

3. A double layer optical disk according to claim 1, wherein said dielectric layer comprises any one of a metal sulfide, a metal oxide, a metal fluoride, or a compound of one or more of metal sulfide, metal oxide, and metal fluoride.

4. A double layer optical disk according to claim 2, wherein said second dielectric layer comprises any one of a metal sulfide, a metal oxide, a metal fluoride, or a compound of one or more of metal sulfide, metal oxide, and metal fluoride.

5. A double layer optical disk according to claim 1, wherein said dielectric layer comprises a nitride, a metal oxide, or a metal fluoride.

6. A double layer optical disk according to claim 2, wherein said second dielectric layer comprises a nitride, a metal oxide, or a metal fluoride.

7. A double layer optical disk according to claim 1, wherein said metal thin film comprises a material selected from metals of Al, Au, Cu, Ni, Pt, Zn, Ag, an alloy including one of said metals as a main ingredient, and a compound including one of said metals as main ingredient.

8. A double layer optical disk according to claim 2, wherein said metal thin film comprises a material selected from metals of Al, Au, Cu, Ni, Pt, Zn, Ag, an alloy including one of said metals as a main ingredient, and a compound including one of said metals as main ingredient.

9. A double layer optical disk according to claim 3, wherein said metal thin film comprises a material selected from metals of Al, Au, Cu, Ni, Pt, Zn, Ag, an alloy including one of said metals as a main ingredient, and a compound including one of said metals as main ingredient.

10. A double layer optical disk according to claim 4, wherein said metal thin film comprises a material selected from metals of Al, Au, Cu, Ni, Pt, Zn, Ag, an alloy including one of said metals as a main ingredient, and a compound including one of said metals as main ingredient.

11. A double layer optical disk according to claim 5, wherein said metal thin film comprises a material selected from metals of Al, Au, Cu, Ni, Pt, Zn, Ag, an alloy including one of said metals as a main ingredient, and a compound including one of said metals as main ingredient.

12. A double layer optical disk according to claim 6, wherein said metal thin film comprises a material selected from metals of Al, Au, Cu, Ni, Pt, Zn, Ag, an alloy including one of said metals as a main ingredient, and a compound including one of said metals as main ingredient.

13. A double layer optical disk comprising:
    a transparent substrate having a specified refractive index, and having a surface with a configuration representing a first set of information;
    a first reflection layer adhered to said surface of said transparent substrate;
    a spacer layer having a surface with a configuration representing a second set of information; and
    a second reflection layer adhered to said surface of said spacer layer, said first reflection layer, said spacer layer and said second reflection layer being consecutively laminated on said substrate to allow a pickup to read said first and second sets of information,
    wherein said first reflection layer comprises:
    a first dielectric layer having a refractive index higher than the refractive index of said transparent substrate and
    a metal thin film layer comprising simple silver, an alloy containing silver as a main ingredient, or a compound including silver as a main ingredient.

14. A double layer optical disk comprising:
    a transparent substrate having a specified refractive index, and having a surface with a configuration representing a first set of information;
    a first reflection layer adhered to said surface of said transparent substrate;
    a spacer layer having a surface with a configuration representing a second set of information; and
    a second reflection layer adhered to said surface of said spacer layer, said first reflection layer, said spacer layer and said second reflection layer being consecutively laminated on said substrate to allow a pickup to read said first and second sets of information,
    wherein said first reflection layer comprises:
    a first dielectric layer having a refractive index higher than the refractive index of said transparent substrate,
    a metal thin film layer comprising simple silver, an alloy containing silver as a main ingredient, or a compound including silver as a main ingredient, and
    a second dielectric layer having a refractive index substantially equal to the refractive index of said transparent substrate.

* * * * *